(12) United States Patent
Lu et al.

(10) Patent No.: US 8,836,367 B2
(45) Date of Patent: Sep. 16, 2014

(54) SIGNAL TRANSCEIVER AND ADAPTIVE IMPEDANCE SWITCH CIRCUIT

(71) Applicant: Wistron NeWeb Corporation, Hsinchu (TW)

(72) Inventors: Cheng-Hsiung Lu, Hsinchu (TW); Yi-Chin Huang, Hsinchu (TW); Chiung-Wen Hsin, Hsinchu (TW)

(73) Assignee: Wistron NeWeb Corporation, Hsinchu Science Park, Hsinchu (TW)

( * ) Notice: Subject to any disclaimer, the term of this patent is extended or adjusted under 35 U.S.C. 154(b) by 76 days.

(21) Appl. No.: 13/625,883

(22) Filed: Sep. 25, 2012

(65) Prior Publication Data

US 2014/0023125 A1    Jan. 23, 2014

(30) Foreign Application Priority Data

Jul. 23, 2012   (TW) .............................. 101126466 A (51) Int. Cl.
 *H03K 17/16*   (2006.01)
(52) U.S. Cl.
 USPC ................................ 326/30; 326/86; 327/109

(58) Field of Classification Search
 USPC ................... 326/30, 82–83, 86; 327/108–109
 See application file for complete search history.

(56) References Cited

U.S. PATENT DOCUMENTS

| | | | |
|---|---|---|---|
| 5,594,372 A * | 1/1997 | Shibata et al. ................. | 326/121 |
| 6,507,220 B1 * | 1/2003 | Groen et al. ..................... | 326/93 |
| 6,690,202 B1 * | 2/2004 | Groen et al. ..................... | 326/93 |
| 6,975,848 B2 * | 12/2005 | Rawlins et al. ............... | 455/307 |
| 2002/0190790 A1 * | 12/2002 | Cheng et al. ..................... | 330/51 |
| 2011/0143685 A1 * | 6/2011 | Cebi .............................. | 455/73 |
| 2013/0278342 A1 * | 10/2013 | Yang et al. ..................... | 330/282 |

FOREIGN PATENT DOCUMENTS

CN         202394070 U      8/2012

* cited by examiner

*Primary Examiner* — Jason M Crawford
(74) *Attorney, Agent, or Firm* — Winston Hsu; Scott Margo (57) ABSTRACT

A signal transceiver includes a connector for receiving a signal, a band-pass filter coupled to the connector for filtering the signal, a front-end module for demodulating the signal and an adaptive impedance switch circuit coupled between the band-pass filter and the front-end module for switching an impedance value between the band-pass filter and the front-end module.

13 Claims, 8 Drawing Sheets

FIG. 6B ns
SIGNAL TRANSCEIVER AND ADAPTIVE IMPEDANCE SWITCH CIRCUIT

BACKGROUND OF THE INVENTION

1. Field of the Invention

The present invention relates to a signal transceiver and adaptive impedance switch circuit, and more particularly, to a signal transceiver and adaptive impedance switch circuit capable of effectively improving return loss when the signal transceiver operates in a power-off state.

2. Description of the Prior Art

Ethernet over Coax (EoC) is a transmission technology in which the Ethernet signals are transmitted over a coaxial cable. The objective of EoC is to connect to the Internet or wideband data transmission utilizing existing cable television infrastructures, which is compatible with existing cable (or satellite TV) broadcast signals, to reach the goal of simultaneously transmission of data signals over the same coaxial cable. Among the EoC methods, the multimedia network standard developed by the multimedia over coax alliance (MoCA) has functionalities of high speed and high quality of service (QoS) which are required for the glitch-free streaming media. According to the multimedia network standard, signals can be sent to each client through the existing coaxial cable, such that the client only needs a signal transceiver to demodulate the signals to obtain services.

Figure 1:
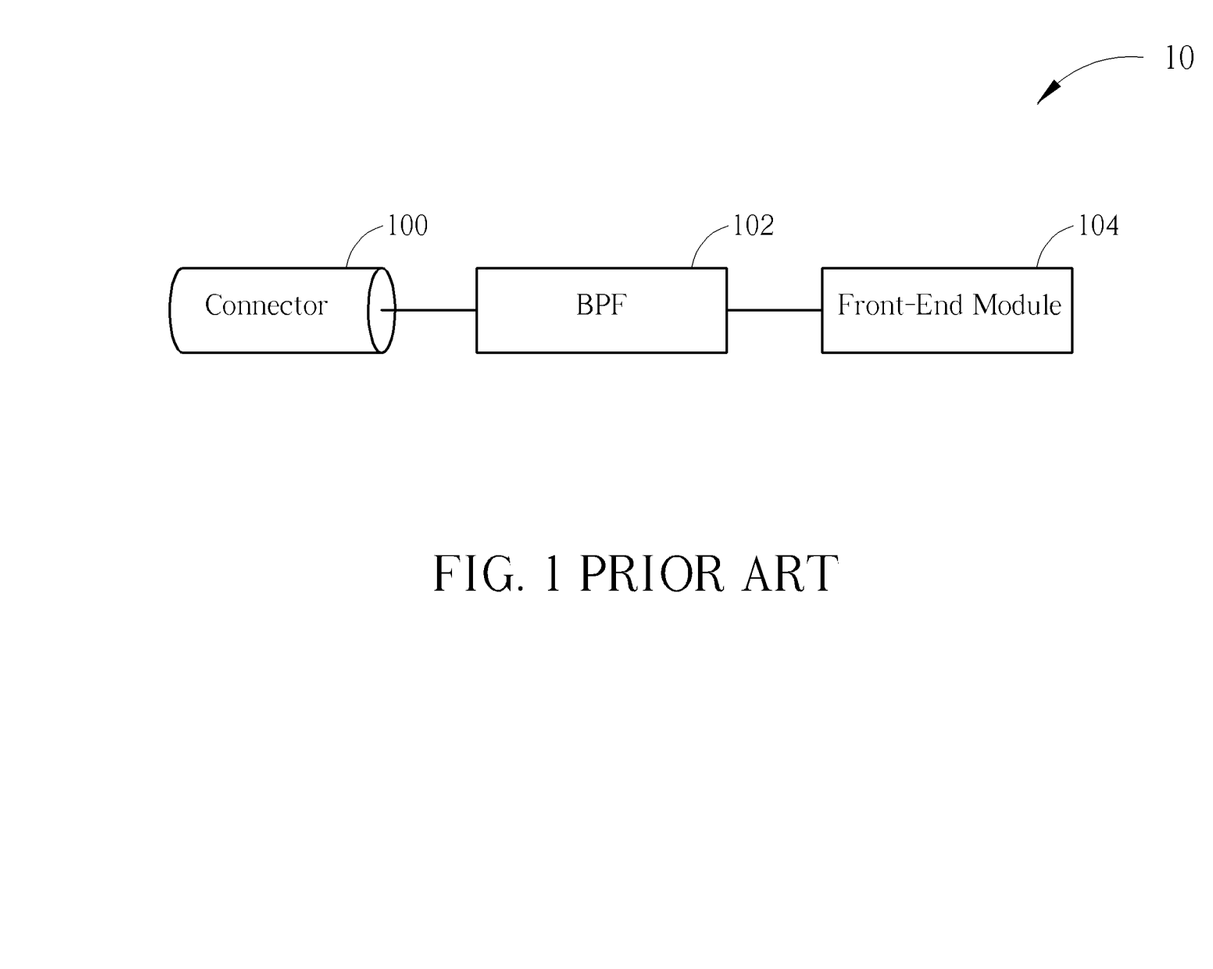
FIG. 1 is a schematic diagram of a conventional signal transceiver.

Please refer to FIG. 1, which is a schematic diagram of a conventional signal transceiver 10. The signal transceiver 10 includes a connector 100, a band-pass filter (BPF) 102 and a front-end module 104. Usually, the signal transceiver 10 is implemented with a set-top box (STB). The connector 100 connects one coaxial cable, for receiving signals including a MoCA signal, which is transmitted via the coaxial cable. The BPF 102 is utilized for filtering the signal, so as to pass the signal within a frequency band. For example, the range of the frequency band of the MoCA signal provided by the U.S. satellite TV service provider DIRECTV™ is from 475 MHz to 625 MHz. If only the MoCA signal needs to be passed, the frequency range of the BPF 102 should be set from 475 MHz to 625 MHz. The front-end module 104 is utilized for demodulating the signal through the BPF 102. In general, the front-end module 104, which is usually integrated into an integrated circuit (IC), includes circuits such as a transmitter-receiver, a power amplifier and an attenuator, etc.

Figure 2A:
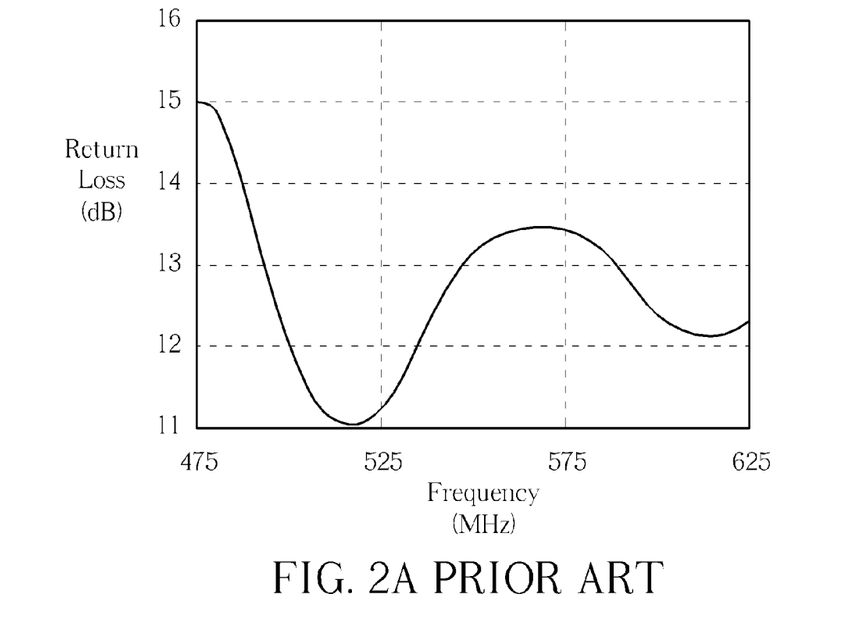
FIG. 2A is a schematic diagram of the return loss between the connector shown in FIG. 1 and a coaxial cable connected to the connector within a specific frequency band when the signal transceiver shown in FIG. 1 operates in a power-on state.
Figure 2B:
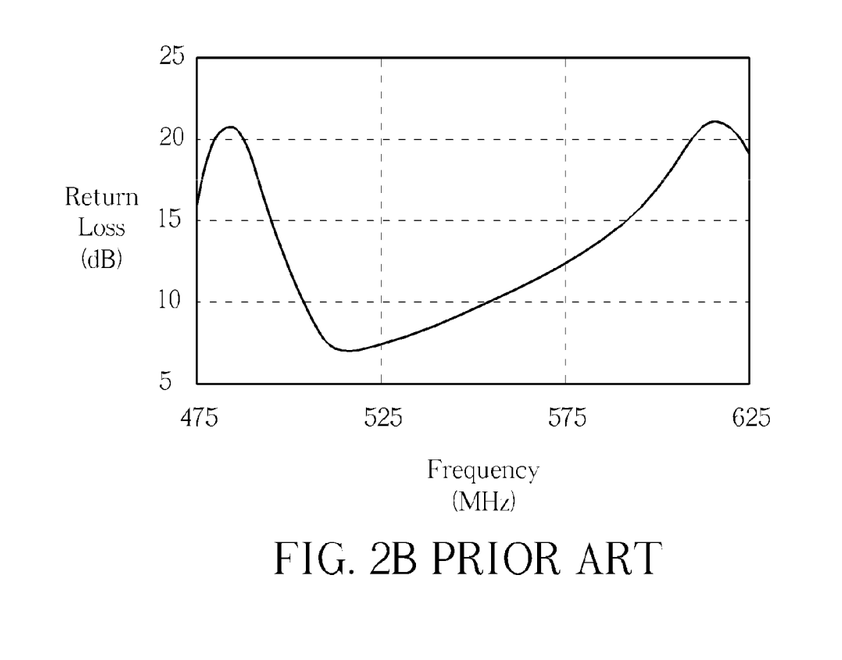
FIG. 2B is a schematic diagram of the return loss between the connector shown in FIG. 1 and a coaxial cable connected to the connector within a specific frequency band when the signal transceiver shown in FIG. 1 operates in a power-off state.

Please refer to FIG. 2A and FIG. 2B, which are schematic diagrams of the return loss between the connector 100 and one coaxial cable (not shown) connected to the connector 100 within a frequency band of 475-625 MHz when the signal transceiver 10 operates in a power-on and power-off state, respectively. By comparing FIG. 2A and FIG. 2B, it can be seen that within the frequency band of 475-625 MHz, the minimum return loss of the signal transceiver 10 in the power-off state is nearly 7.6 dB, which is 3.4 dB lower than in the power-on state (nearly 11 dB). As can be seen from the above, if the signal transceiver 10 operates in the power-off state, the system may encounter performance degradation due to over-low return loss.

SUMMARY OF THE INVENTION

It is therefore a primary objective of the present invention to provide a signal transceiver and adaptive impedance switch circuit capable of effectively improving return loss when the signal transceiver operates in a power-off state.

An embodiment of the present invention discloses a signal transceiver, which includes a connector for receiving a signal, a band-pass filter coupled to the connector for filtering the signal, a front-end module for demodulating the signal and an adaptive impedance switch circuit coupled between the band-pass filter and the front-end module for switching an impedance value between the band-pass filter and the front-end module.

The embodiment of the present invention further discloses an adaptive impedance switch circuit for switching an impedance value in a signal transceiver. The adaptive impedance switch circuit includes an input terminal for receiving a signal; an output terminal for outputting the signal; a voltage input circuit for providing an input voltage; a frequency resonant circuit coupled to the input terminal and the voltage input circuit for adjusting the impedance value; and a bias circuit coupled between the output terminal and a node connected by the input terminal, the voltage input circuit and the frequency resonant circuit for converting a voltage value of the signal.

These and other objectives of the present invention will no doubt become obvious to those of ordinary skill in the art after reading the following detailed description of the preferred embodiment that is illustrated in the various figures and drawings.

DETAILED DESCRIPTION

Figure 3:
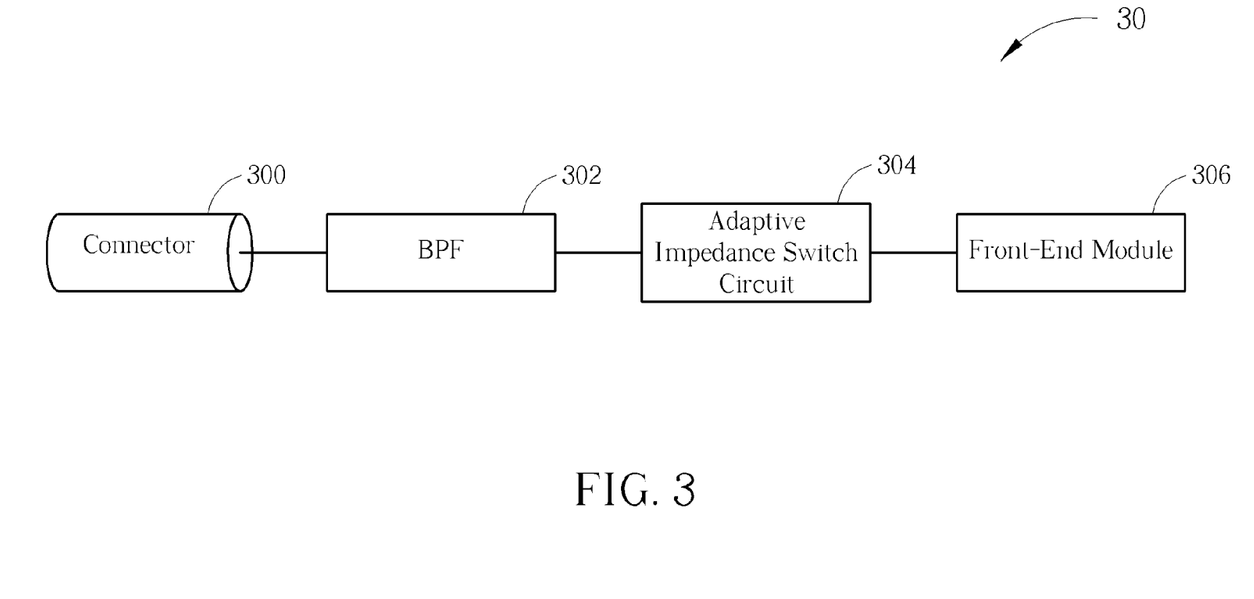
FIG. 3 is a schematic diagram of a signal transceiver according to an embodiment of the present invention.

Please refer to FIG. 3, which is a schematic diagram of a signal transceiver 30 according to an embodiment of the present invention. The signal transceiver 30 includes a connector 300, a band-pass filter (BPF) 302, an adaptive impedance switch circuit 304 and a front-end module 306. The connector 300, the BPF 302 and the front-end module 306 are respectively similar to the connector 100, the BPF 102 and the front-end module 104 of the conventional signal transceiver 10, and thus the same components are not narrated hereinafter for simplicity. The adaptive impedance switch circuit 304, which is coupled to the BPF 302 and the front-end module 306, is utilized for switching an impedance value between the BPF 302 and the front-end module 306.

Figure 4A:
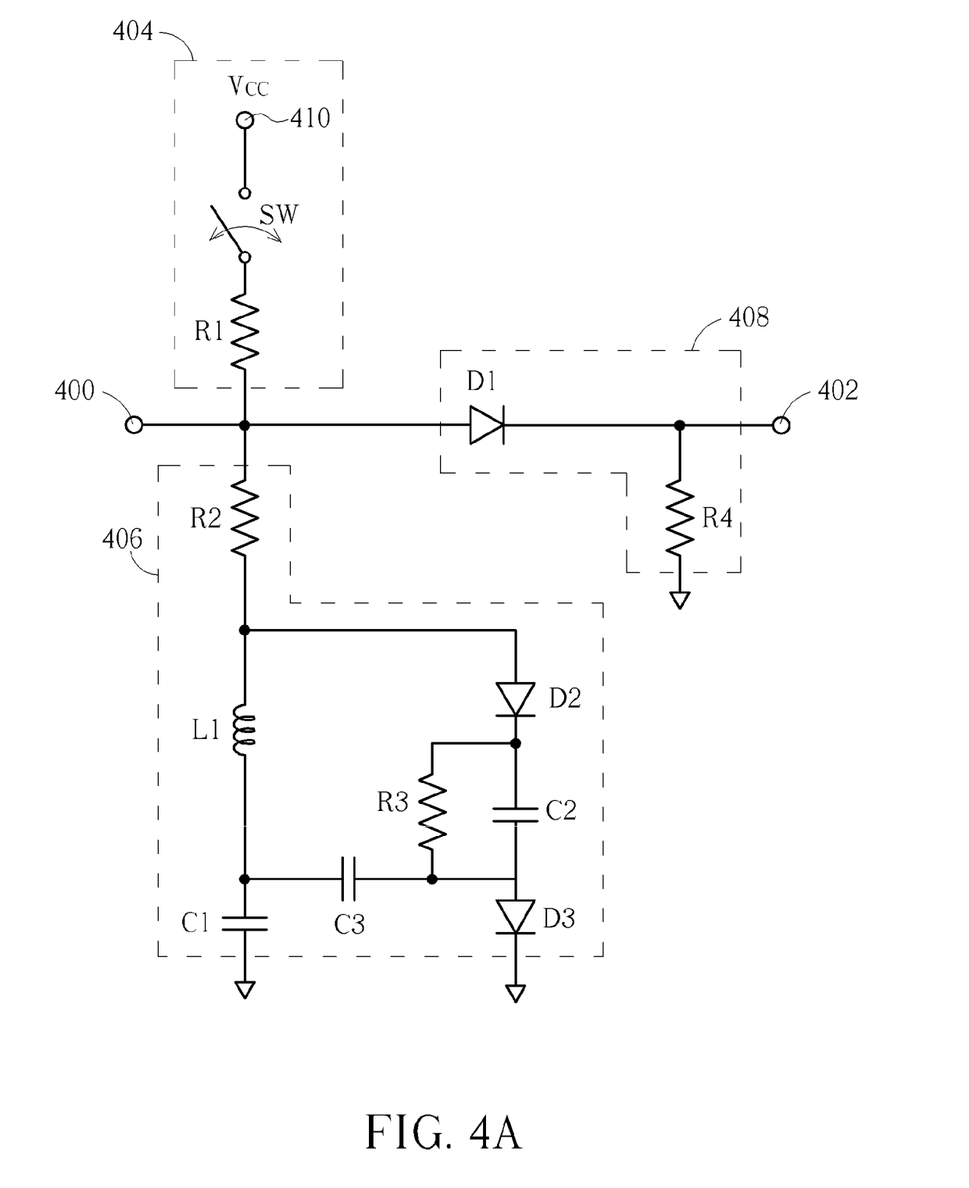
FIG. 4A is a schematic diagram of an adaptive impedance switch circuit shown in FIG. 3.

Please refer to FIG. 4A, which is one implementation of the adaptive impedance switch circuit 304 shown in FIG. 3. In FIG. 4A, the adaptive impedance switch circuit 304 includes an input terminal 400, an output terminal 402, a voltage input circuit 404, a frequency resonant circuit 406 and a bias circuit 408. The input terminal 400, which is coupled to the BPF 302, is used for receiving the signal passed through the BPF 302. The output terminal 402, which is coupled to the front-end module 306, is used for outputting the filtered signal to the front-end module 306. The voltage input circuit 404, which is used for providing the input voltage Vcc, includes a voltage input terminal 410, a switcher SW and a resistor R1. Thereamong, the voltage input terminal 410 is used for receiving the input voltage Vcc, the switcher SW is used for switching the status of the voltage input circuit 404, and the resistor R1 is coupled to the switcher SW. The frequency resonant circuit 406, which is coupled to the input terminal 400 and the voltage input circuit 404, is used for adjusting the impedance value between the BPF 302 and the front-end module 306. The frequency resonant circuit 406 includes the resistors R2 and R3, the capacitors C1, C2 and C3, the inductor L1 and the switches D2 and D3. The bias circuit 408 is coupled between the output terminal and a node connected by the input terminal 400, the voltage input circuit 404 and the frequency resonant circuit 406. The bias circuit 408 includes the resistor R4 and the switch D1. The aforementioned switches D1, D2 and D3 are preferably implemented using diodes, and the resistance of the resistor R2 may be determined according to an element (e.g. coaxial cable) connected to the connector.

Figure 4B:
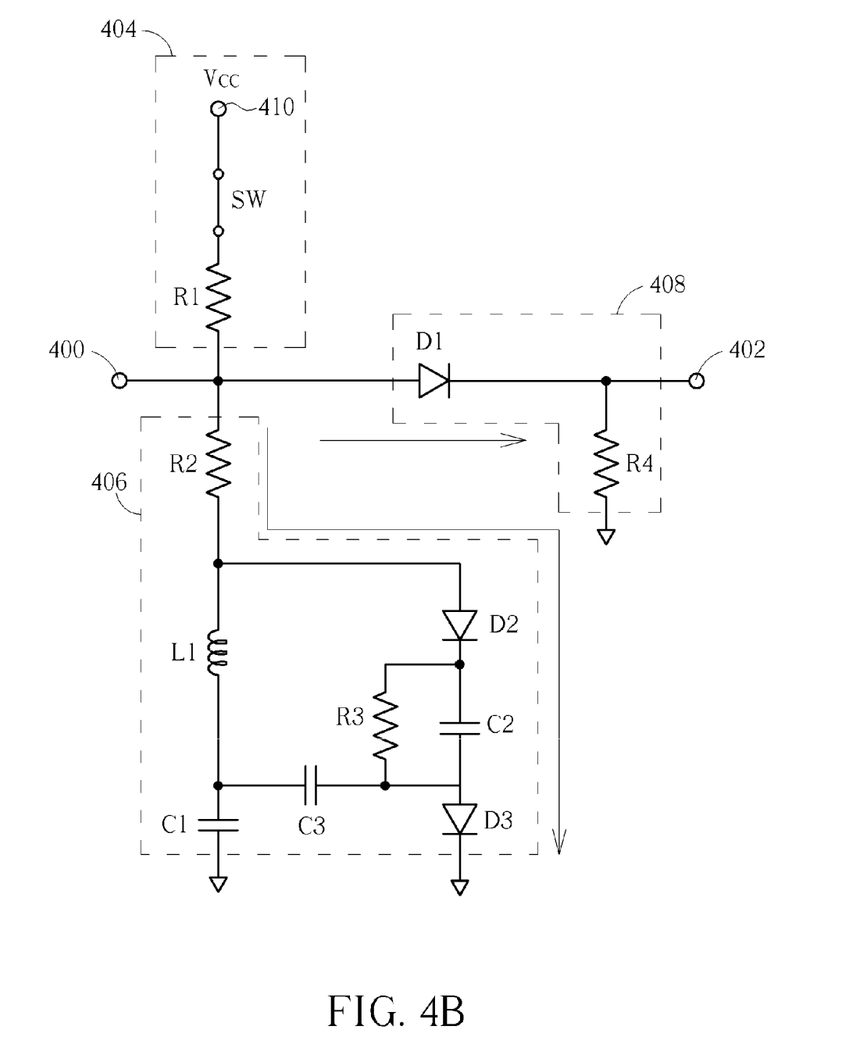
FIG. 4B is a schematic diagram of the current direction when the switcher of the adaptive impedance switch circuit shown in FIG. 3 switches to a conducted state.
Figure 4C:
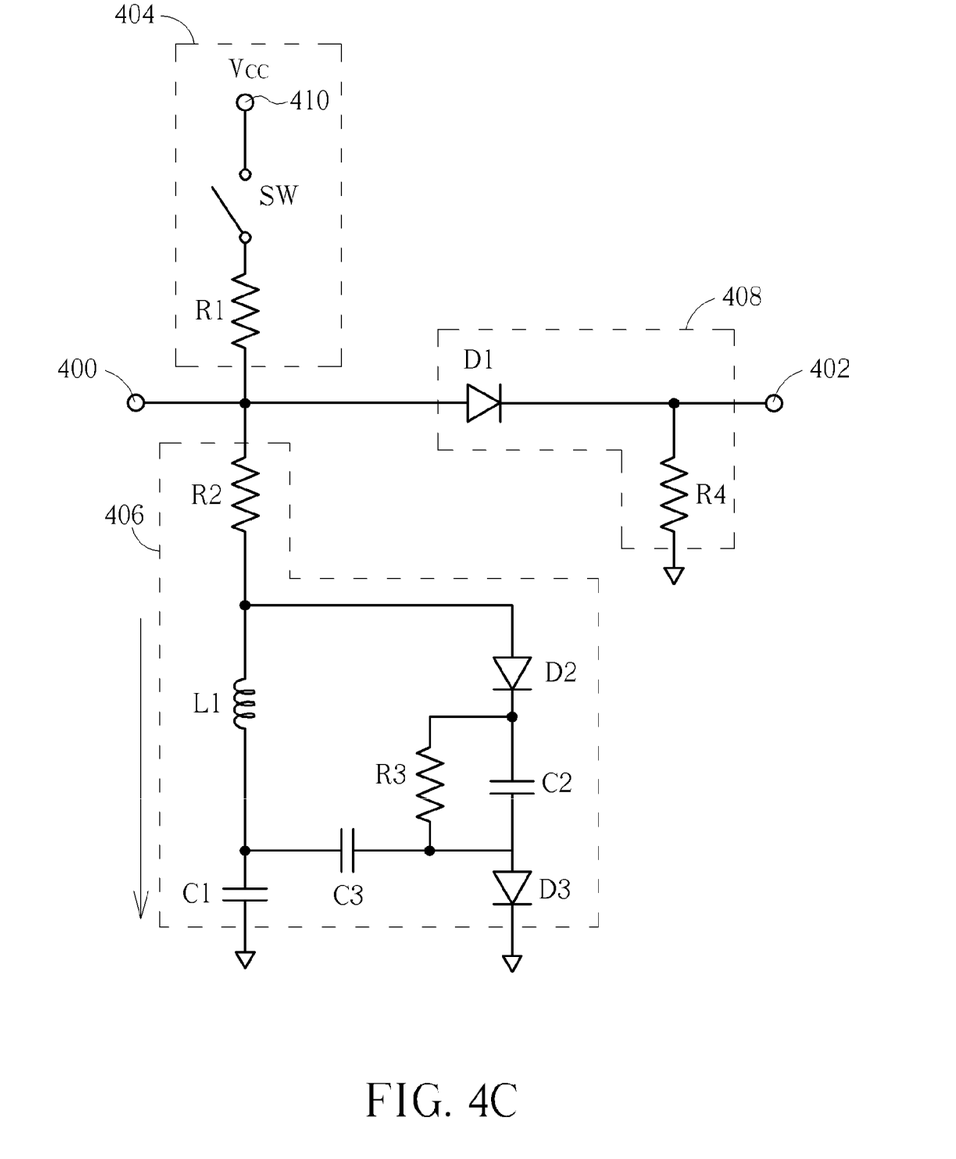
FIG. 4C is a schematic diagram of the current direction when the switcher of the adaptive impedance switch circuit shown in FIG. 3 switches to a non-conducted state.

FIG. 4B and FIG. 4C illustrate the current flow directions in the adaptive impedance switch circuit 304 when the switcher SW switched to the conducted and non-conducted states, respectively. As shown in FIG. 4B, when the switcher SW switches to a conducted state (i.e. power-on state), the switches D1, D2 and D3 are conducted, and thus there are two current flows with different directions (illustrated as arrows in FIG. 4B): one passes through the switch D1, and the other passes through the resistor R2, the switch D2, the capacitor C2 and the switch D3 to a ground terminal. The capacitor C3 with higher capacitance and the resistor R3 with higher resistance may be designed to avoid reverse current flow. As shown in FIG. 4C, when the switcher SW switches to a non-conducted state (i.e. power-off state), the switches D1, D2 and D3 are all non-conducted, such that the current flow passes through the resistor R2, the inductor L1 and the capacitor C1 to the ground terminal (illustrated as arrow in FIG. 4C). That is, the path combined with the resistor R2, the inductor L1 and the capacitor C1 is short-circuited.

The adaptive impedance switch circuit 304 according to the embodiment of the present invention is an independent circuit, which is coupled between the BPF 302 and the front-end module 306. Alternatively, the adaptive impedance switch circuit 304 and the front-end module 306 may be integrated into an integrated circuit.

Figure 5A:
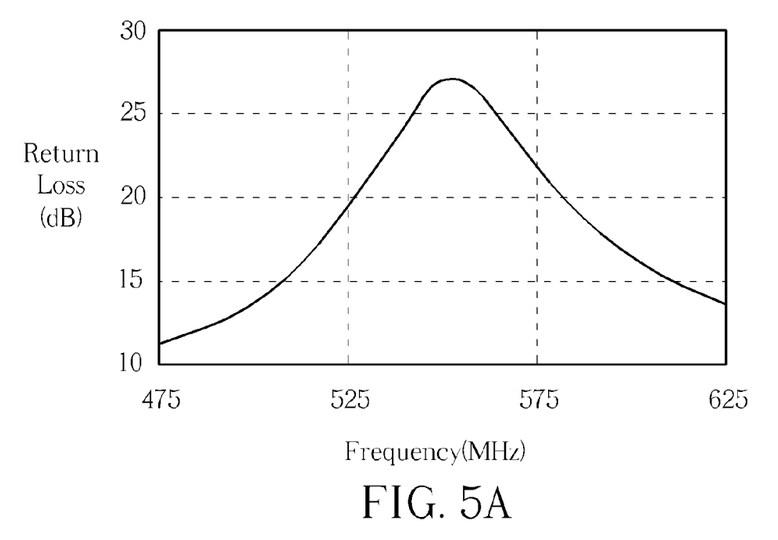
FIG. 5A is a schematic diagram of the return loss between the band-pass filter and the front-end module shown in FIG. 3 within a specific frequency band when the signal transceiver shown in FIG. 3 operates in the power-on state.
Figure 5B:
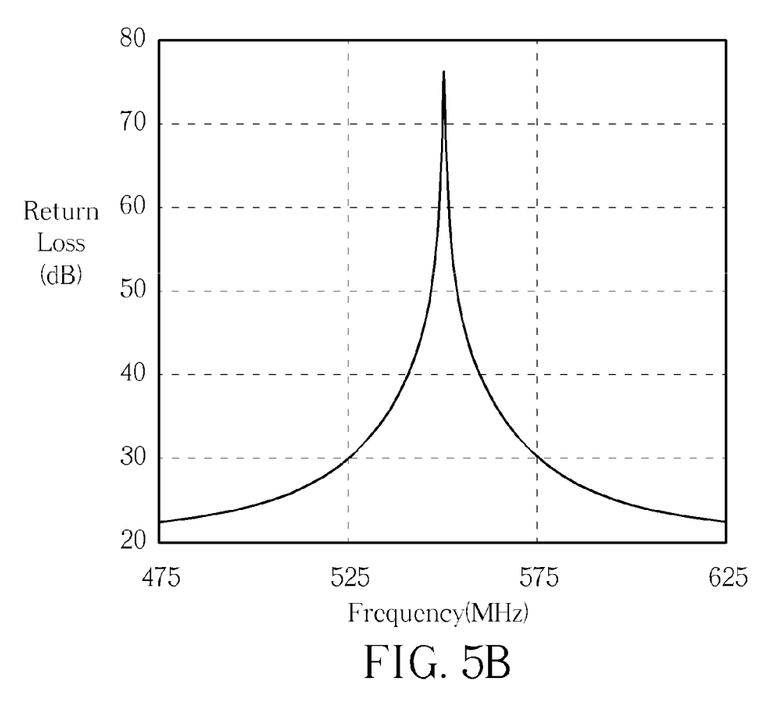
FIG. 5B is a schematic diagram of the return loss between the band-pass filter and the front-end module shown in FIG. 3 within a specific frequency band when the signal transceiver shown in FIG. 3 operates in the power-off state.

Please refer to FIG. 5A and FIG. 5B, which are schematic diagrams of the return losses between the BPF 302 and the front-end module 306 within the frequency band 475-625 MHz when the signal transceiver 30 operates in the power-on state and power-off state, respectively. By comparing FIG. 5A and FIG. 5B, it can be seen that when the signal transceiver 30 operates in the power-off state, the minimum return loss between the BPF 302 and the front-end module 306 within the frequency band 475-625 MHz is nearly 20 dB, which is 9 dB higher than that in the power-on state (nearly 11 dB). As mentioned above, when the signal transceiver 30 operates in the power-off state, the return loss between the BPF 302 and the front-end module 306 will increase.

Figure 6A:
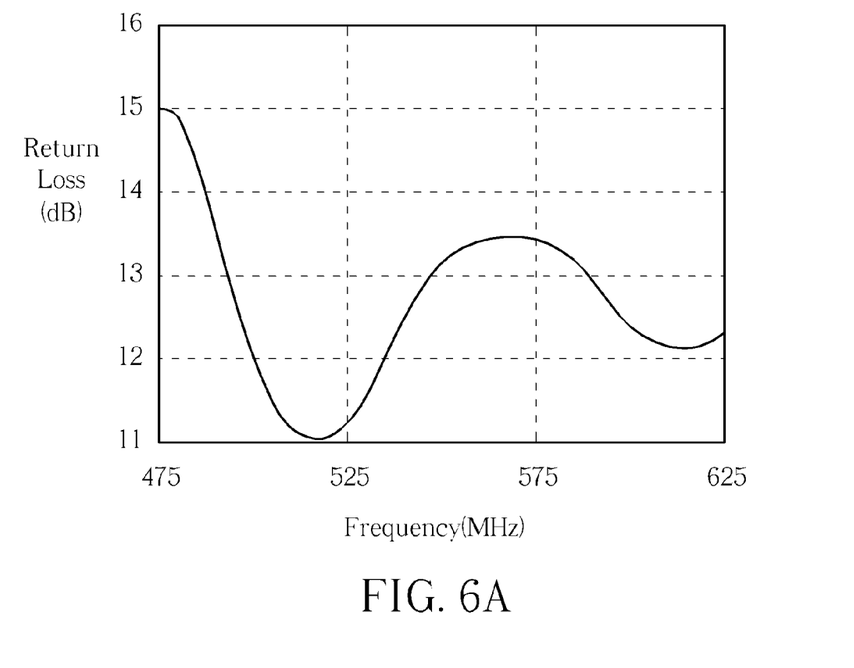
FIG. 6A is a schematic diagram of the return loss between the connector shown in FIG. 3 and a coaxial cable connected to the connector within a specific frequency band when the signal transceiver shown in FIG. 3 operates in the power-on state.
Figure 6B:
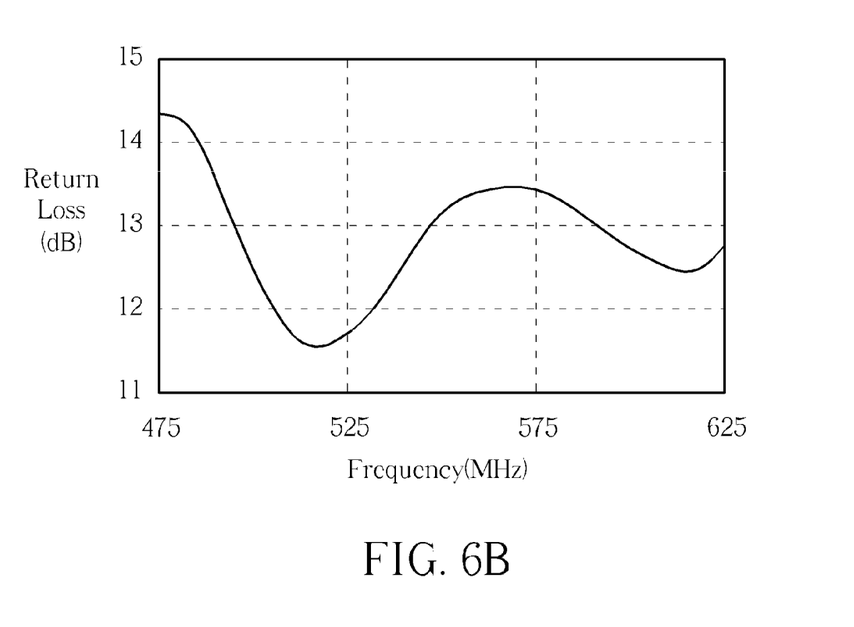
FIG. 6B is a schematic diagram of the return loss between the connector shown in FIG. 3 and a coaxial cable connected to the connector within a specific frequency band when the signal transceiver shown in FIG. 3 operates in the power-off state.

Please refer to FIG. 6A and FIG. 6B, which are schematic diagrams of the return losses between the connector 300 and a coaxial cable (not shown) connected to the connector 300 within the frequency band 475-625 MHz when the signal transceiver 30 operates in the power-on state and power-off state, respectively. By comparing FIG. 6A and FIG. 6B, it can be seen that when the signal transceiver 30 operates in the power-off state, the minimum return loss between the connector 300 and the coaxial cable (not shown) within the frequency band 475-625 MHz is nearly 11.5 dB, which is 0.5 dB higher than that in the power-on state (nearly 11 dB). As mentioned above, when the signal transceiver 30 operates in the power-off state, the return loss between the connector 300 and the coaxial cable (not shown) may be kept higher than that in the power-on state.

Note that, the aforementioned FIG. 5B and FIG. 6B only illustrate that within the frequency band 475-625 MHz, the minimum return loss of the signal transceiver 30 can effectively increase when the signal transceiver 30 operates in the power-off state. Those skilled in the art may adjust the characteristics of the elements in the adaptive impedance switch circuit 304 according to various frequency bands, such that the minimum return losses in various frequency bands can effectively increase.

The return loss of the prior art signal transceiver may decrease when the signal transceiver operates in the power-off state, causing the system performance to degrade. In comparison, the signal transceiver of the present invention can switch the impedance value between the band-pass filter and the front-end module by utilizing the adaptive impedance switch circuit when the signal transceiver operates in the power-off state, so as to improve the return loss effectively.

To sum up, the signal transceiver of the present invention can improve the return loss effectively when the signal transceiver operates in a power-off state, and therefore the system performance is improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A signal transceiver, comprising:
    a connector, for receiving a signal;
    a band-pass filter, coupled to the connector, for filtering the signal;
    a front-end module, for demodulating the signal; and
    an adaptive impedance switch circuit, coupled between the band-pass filter and the front-end module, for switching an impedance value between the band-pass filter and the front-end module when the signal transceiver switches between a power-on state and a power-off state.

2. The signal transceiver of claim 1, wherein the adaptive impedance switch circuit comprises:
    an input terminal, coupled to the band-pass filter, for receiving the signal;

an output terminal, coupled to the front-end module, for outputting the signal to the front-end module;

a voltage input circuit, for providing an input voltage;

a frequency resonant circuit, coupled to the input terminal and the voltage input circuit, for adjusting the impedance value; and a bias circuit, coupled between the front-end module and a node connected by the input terminal, the voltage input circuit and the frequency resonant circuit, for converting a voltage value of the signal.

3. The signal transceiver of claim 2, wherein the voltage input circuit comprises:

a voltage input terminal, for receiving the input voltage;

a switcher, coupled to the voltage input terminal, for switching a state of the voltage input circuit; and a first resistor, coupled to the switcher.

4. The signal transceiver of claim 2, wherein the frequency resonant circuit comprises:

a second resistor, having one terminal coupled to the voltage input circuit and the input terminal;

an inductor, having one terminal coupled to the second resistor;

a first capacitor, having one terminal coupled to the inductor;

a first switch, having one terminal coupled between the second resistor and the inductor;

a second capacitor, having one terminal coupled to the first switch;

a second switch, having one terminal coupled to the second capacitor; and a third capacitor, having one terminal coupled between the inductor and the first capacitor, and another terminal coupled between the second capacitor and the second switch.

5. The signal transceiver of claim 4, further comprising:

a third resistor in parallel with the second capacitor.

6. The signal transceiver of claim 4, wherein a resistance value of the second resistor is determined according to an element connected to the connector.

7. The signal transceiver of claim 2, wherein the bias circuit comprises:

a third switch; and a fourth resistor, coupled between the third switch and the output terminal.

8. An adaptive impedance switch circuit for switching an impedance value in a signal transceiver, the adaptive impedance switch circuit comprising:

an input terminal, for receiving a signal;

an output terminal, for outputting the signal;

a voltage input circuit, for providing an input voltage;

a frequency resonant circuit, coupled to the input terminal and the voltage input circuit, for adjusting the impedance value; and a bias circuit, coupled between the output terminal and a node connected by the input terminal, the voltage input circuit and the frequency resonant circuit, for converting a voltage value of the signal.

9. The adaptive impedance switch circuit of claim 8, wherein the voltage input circuit comprises:

a voltage input terminal, for receiving the input voltage;

a switcher, coupled to the voltage input terminal, for switching a state of the voltage input circuit; and a first resistor, coupled to the switcher.

10. The adaptive impedance switch circuit of claim 8, wherein the frequency resonant circuit comprises:

a second resistor, having one terminal coupled to the voltage input circuit and the input terminal;

an inductor, having one terminal coupled to the second resistor;

a first capacitor, having one terminal coupled to the inductor;

a first switch, having one terminal coupled between the second resistor and the inductor;

a second capacitor, having one terminal coupled to the first switch;

a second switch, having one terminal coupled to the second capacitor; and a third capacitor, having one terminal coupled between the inductor and the first capacitor, and another terminal coupled between the second capacitor and the second switch.

11. The adaptive impedance switch circuit of claim 10, further comprising:

a third resistor in parallel with the second capacitor.

12. The adaptive impedance switch circuit of claim 10, wherein a resistance value of the second resistor is determined according to an element connected to the signal transceiver.

13. The adaptive impedance switch circuit of claim 8, wherein the bias circuit comprises:

a third switch; and a fourth resistor, coupled between the third switch and the output terminal.

* * * * *